(12) United States Patent
Musha

(10) Patent No.: US 9,920,662 B2
(45) Date of Patent: Mar. 20, 2018

(54) CAM CAP

(71) Applicant: TOYOTA JIDOSHA KABUSHIKI KAISHA, Toyota-shi, Aichi-ken (JP)

(72) Inventor: Yoshio Musha, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 15/083,933

(22) Filed: Mar. 29, 2016

(65) Prior Publication Data
US 2016/0290182 A1 Oct. 6, 2016

(30) Foreign Application Priority Data

Mar. 30, 2015 (JP) .................................. 2015-070070

(51) Int. Cl.
*F01M 1/06* (2006.01)
*F01L 1/46* (2006.01)
(Continued)

(52) U.S. Cl.
CPC ................. *F01L 1/46* (2013.01); *F01L 1/053* (2013.01); *F01M 9/10* (2013.01); *F01M 9/102* (2013.01); *F01M 9/106* (2013.01); *F16C 17/04* (2013.01); *F01L 2001/0476* (2013.01); *F01L 2001/0537* (2013.01); *F01L 2250/02* (2013.01); *F01L 2810/02* (2013.01); *F16C 2360/18* (2013.01)

(58) Field of Classification Search
CPC ..... F01L 1/053; F01L 1/46; F01L 2001/0476; F01L 2001/0537; F01L 2250/02; F01L 2810/02; F01M 9/102; F01M 9/106; F16C 2360/18

USPC ................................ 123/90.27, 90.31, 90.33
See application file for complete search history.

(56) References Cited

U.S. PATENT DOCUMENTS 4,593,657 A * 6/1986 Aoi ........................ F01L 1/0532
  123/193.5
5,803,031 A * 9/1998 Moriya ............... F01L 1/34406
  123/90.17
(Continued)

FOREIGN PATENT DOCUMENTS

JP     H09-242523 A    9/1997
JP     H11-315708 A    11/1999
(Continued)

*Primary Examiner* — Marguerite McMahon
*Assistant Examiner* — Tea Holbrook
(74) *Attorney, Agent, or Firm* — Oliff PLC

(57) ABSTRACT

A cam cap is placed on a journal of a camshaft attached to a sprocket to constitute a bearing supporting the journal. The cam cap includes an accommodating groove in which a thrust plate provided on the journal is accommodated, an oil passage having an opening at a position facing a camshaft oil groove of the journal, the oil passage communicating with the accommodating groove, and an oil reservoir provided in a first sidewall of the accommodating groove. The cam cap is placed on the journal such that the accommodating groove is located at a position closer to the sprocket than is the opening of the oil passage. When the thrust plate is accommodated in the accommodating groove, the oil passage and the oil reservoir communicate with each other at a position outward of an outer peripheral edge of the thrust plate in a radial direction of the thrust plate.

6 Claims, 7 Drawing Sheets

(51) Int. Cl.
*F16C 17/04* (2006.01)
*F01L 1/053* (2006.01)
*F01M 9/10* (2006.01)
*F01L 1/047* (2006.01)

(56) References Cited

U.S. PATENT DOCUMENTS

| | | | | |
|---|---|---|---|---|
| 6,026,772 | A * | 2/2000 | Shirabe | F01L 1/3442 123/90.17 |
| 6,786,643 | B2 * | 9/2004 | Hada | F01L 1/024 384/368 |
| 7,322,327 | B1 * | 1/2008 | Kim | F01L 1/053 123/90.16 |
| 2003/0140886 | A1 * | 7/2003 | Hada | F01L 1/024 123/195 A |
| 2008/0060595 | A1 * | 3/2008 | Yoshijima | F01L 1/344 123/90.16 |
| 2010/0126459 | A1 * | 5/2010 | Tawarada | F01L 1/022 123/195 R |
| 2014/0299092 | A1 * | 10/2014 | Menonna | F16C 17/04 123/195 C |

FOREIGN PATENT DOCUMENTS

| | | |
|---|---|---|
| JP | 2003-222003 A | 8/2003 |
| JP | 2013-144953 A | 7/2013 |

* cited by examiner

CAM CAP

INCORPORATION BY REFERENCE

The disclosure of Japanese Patent Application No. 2015-070070 filed on Mar. 30, 2015 including the specification, drawings and abstract is incorporated herein by reference in its entirety.

BACKGROUND

1. Technical Field

The disclosure relates to a cam cap constituting a bearing that supports a camshaft. More specifically, the disclosure relates to a cam cap including an oil supply structure for supplying lubricating oil to a sliding section at which the cam cap and a thrust plate slide with respect to each other.

2. Description of Related Art

There is a known configuration in which a camshaft is provided with a thrust plate that is a disk-shaped protrusion in order to restrict the axial movement of the camshaft. Japanese Patent Application Publication No. 9-242523 (JP 9-242523 A) describes a configuration in which a cam cap includes an oil groove for introducing lubricating oil to a sliding section at which the cam cap and a thrust plate slide with respect to each other. The cam cap constitutes a bearing that supports a camshaft provided with the thrust plate. JP 9-242523A describes a configuration in which the lubricating oil is supplied through the oil groove to the sliding section at which the cam cap and the thrust plate slide with respect to each other.

A bearing that supports a camshaft provided with a thrust plate may adopt a configuration, as illustrated in FIG. 7, where a cam cap 110 includes an accommodating groove 112 in which a thrust plate 133 is accommodated and a journal 135 on which the thrust plate 133 is provided is covered with the cam cap 110.

For example, when such a bearing is employed, lubricating oil is supplied to a gap between the journal 135 and the cam cap 110 through a camshaft oil groove 132 of the journal 135 of a camshaft 130. The lubricating oil supplied to the gap between the journal 135 and the cam cap 110 is supplied into the accommodating groove 112.

As illustrated in FIG. 7, a moment in an R1 direction is generated in the camshaft 130 by tension of a timing chain 121 looped over a sprocket 120 attached to the camshaft 130. Thus, the thrust plate 133 is pressed against a first sidewall 112A positioned on the sprocket 120 side, out of first and second sidewalls 112A, 112B of the accommodating groove 112 in the bearing having the above-described configuration. As a result, a load is applied to the first sidewall 112A. As illustrated in FIG. 7, when an accommodating groove in which the thrust plate 133 is accommodated is not provided in a cam housing 108 that covers the journal 135 from below, the accommodating groove 112 is open at a lower end 110C of the cam cap 110, as illustrated in FIG. 8.

SUMMARY

The lubricating oil needs to be sufficiently supplied to a portion to which the thrust plate 133 is pressed due to the tension of the timing chain 121. However, even when the lubricating oil reaches the accommodating groove 112 through the gap between the journal 135 and the cam cap 110, it may be difficult to cause the lubricating oil to flow along the outside of the thrust plate 133 and guide the lubricating oil to the first sidewall 112A positioned on the sprocket 120 side.

Further, with the configuration, the lubricating oil leaks from openings of the accommodating groove 112, which are located at the lower end 110C, as indicated by arrows in FIG. 8. As a result, it may be particularly difficult to supply the lubricating oil to a clearance between the first sidewall 112A (refer to FIG. 7) of the accommodating groove 112 and the thrust plate 133.

The present disclosure provides a cam cap configured such that lubricating oil is reliably supplied to a sprocket-side sidewall of an accommodating groove in which a thrust plate is accommodated.

An example aspect of the disclosure provides a cam cap configured to be placed on a journal of a camshaft attached to a sprocket, the cam cap constituting a bearing that supports the journal. The cam cap includes: an accommodating groove configured to accommodate a thrust plate of the journal, the accommodating groove having a first sidewall and a second sidewall, the first and second sidewalls opposing each other, the first sidewall being located in a portion of the cam cap that is closer to the sprocket than the second sidewall when the cam cap is placed on the journal of the camshaft; an oil passage having an opening at a position facing a camshaft oil groove of the journal when the cam cap is placed on the journal of the camshaft, the oil passage communicating with the accommodating groove; and an oil reservoir provided in the first sidewall of the accommodating groove. The oil reservoir is a recess. When the cam cap is placed on the journal of the camshaft, the accommodating groove is located at a position closer to the sprocket than is the opening of the oil passage. When the earn cap is placed on the journal of the camshaft such that the thrust plate is accommodated in the accommodating groove, the oil passage and the oil reservoir communicate with each other at a position outward of an outer peripheral edge of the thrust plate in the radial direction of the thrust plate.

With the above-described configuration, the lubricating oil supplied from the camshaft oil groove is introduced from the outside of the thrust plate to the oil reservoir through the oil passage provided inside the cam cap. The lubricating oil accumulated in the oil reservoir, which is located closer to the sprocket than is the thrust plate, is supplied to a sliding section at which the first sidewall of the accommodating groove, which is located on the sprocket side, and the thrust plate slide with respect to each other. Thus, it is possible to supply the lubricating oil to the first sidewall of the accommodating groove in which the thrust plate is accommodated.

In the cam cap according to the above aspect, the oil passage may have a vertical bore and a horizontal bore, the vertical bore may extend in the radial direction of the camshaft from the opening at the position facing the camshaft oil groove, the horizontal bore may intersect with the vertical bore and the accommodating groove, and the oil reservoir may be a distal end portion of the horizontal bore.

With the above configuration, it is possible to form the oil passage and the oil reservoir from two oil bores, that is, the vertical bore and the horizontal bore. The cam cap according to the above aspect may further include a sealing plug that seals an opening at one end of the horizontal bore, the opening being located on a side surface of the cam cap. The horizontal bore may extend from the side surface of the cam cap into the cam cap.

With the above configuration, the horizontal bore is formed by machining, and therefore the horizontal bore is formed more easily than in a case where a horizontal bore is formed during casting a cam cap.

The cam cap according to the above aspect may further include a sealing plug. The oil passage may have a vertical bore and a horizontal bore. The vertical bore may, extend in the radial direction of the camshaft from the opening at the position facing the camshaft oil groove. The horizontal bore may extend from a side surface of the cam cap, the side surface being located on the sprocket side of the cam cap. The horizontal bore may intersect with the accommodating groove and the vertical bore. The sealing plug may seal an opening at an end of the horizontal bore, the opening being located on the side surface of the cam cap. The oil reservoir may be an end portion of the horizontal bore, the end portion being located on the sprocket side of the cam cap.

With the above configuration, it is possible to adjust the depth of the oil reservoir, that is, the volume of the oil reservoir, by adjusting the shape of the sealing plug. In the cam cap according to the above aspect, the vertical bore may be provided at a position facing the camshaft oil groove.

With the above configuration, the vertical bore is formed by machining, and thus the vertical bore is formed more easily than in a case where a vertical bore is formed during casting of a cam cap.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a cam cap according to a first embodiment will be described with reference to FIG. 1 to FIG. 5. First, the relationship between camshafts and a crankshaft in an internal combustion engine provided with the cam cap of the first embodiment will be described with reference to FIG. 1.

Figure 1:
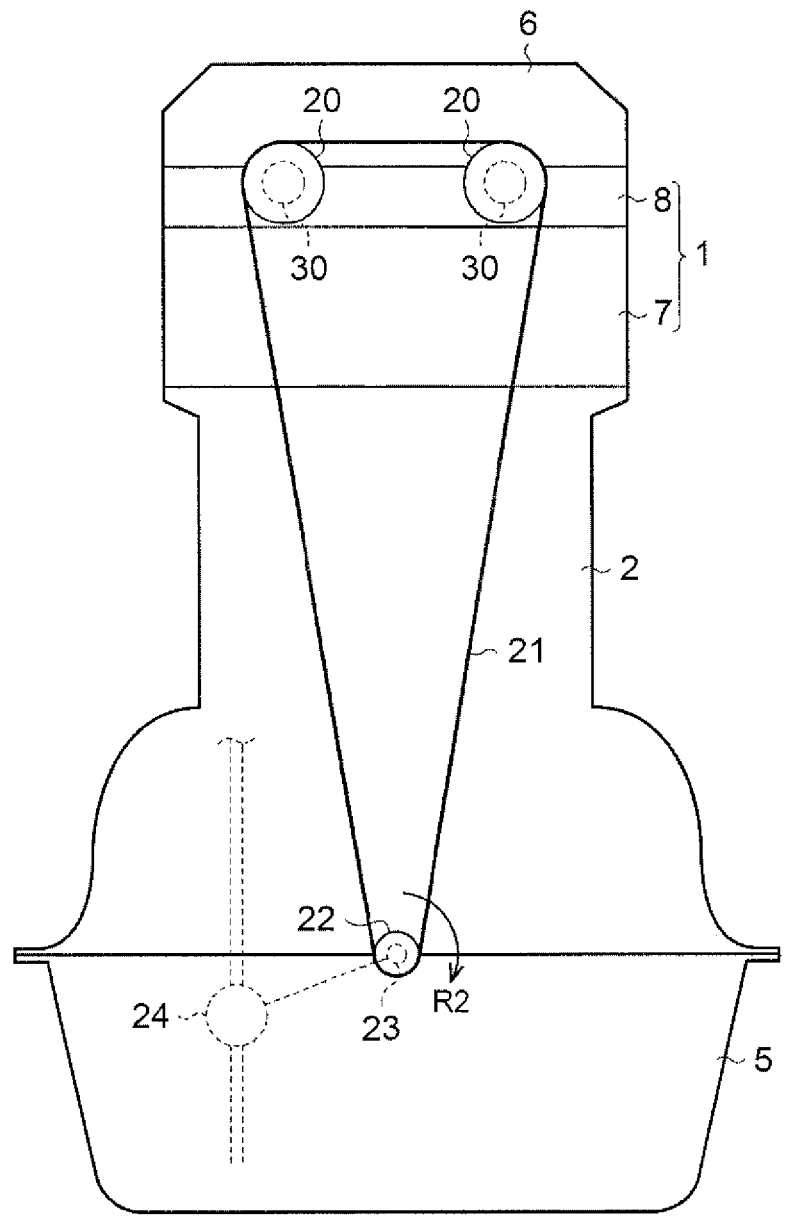
FIG. 1 is a side view of an internal combustion engine, schematically illustrating the relationship between camshafts and a crankshaft in the internal combustion engine provided with a cam cap of a first embodiment.

As illustrated in FIG. 1, in the internal combustion engine provided with the cam cap of the first embodiment, a cylinder block 2 is fixed to the bottom of a cylinder head 1. An oil pan 5, in which oil is stored, is fixed to the bottom of the cylinder block 2.

A crankshaft 23 to which a sprocket 22 is attached, is rotatably supported by a lower portion of the cylinder block 2. A cylinder head cover 6 that covers the upper side of the cylinder head 1 is fixed to the top of the cylinder head 1. The cylinder head 1 includes a cylinder head body 7 that is fixed to the top of the cylinder block 2, and a cam housing 8 that is fixed to the top of the cylinder head body 7.

Two camshafts 30 are rotatably supported by the cam housing 8. The two camshafts 30 are an intake camshaft and an exhaust camshaft. A sprocket 20 is attached to each of the two camshafts 30. A timing chain 21 is looped over the sprocket 22 attached to the crankshaft 23 and the two sprockets 20.

With this configuration, when the crankshaft 23 rotates, the two camshafts 30 also rotate in conjunction with the rotation of the crankshaft 23. The crankshaft 23 rotates in an R2 direction during an operation of the engine. An oil pump 24 is connected to the crankshaft 23. The oil pump 24 is driven by the rotation of the crankshaft 23.

The oil pump 24 draws the lubricating oil up from the oil pan 5, and supplies the lubricating oil to various portions of the engine through lubricating oil passages provided inside the cylinder block 2 and the cylinder head 1. The lubricating oil supplied to the various portions of the engine flows downward through the inside of the cylinder head 1 and the inside of the cylinder block 2, and is then stored in the oil pan 5 again.

Figure 2:
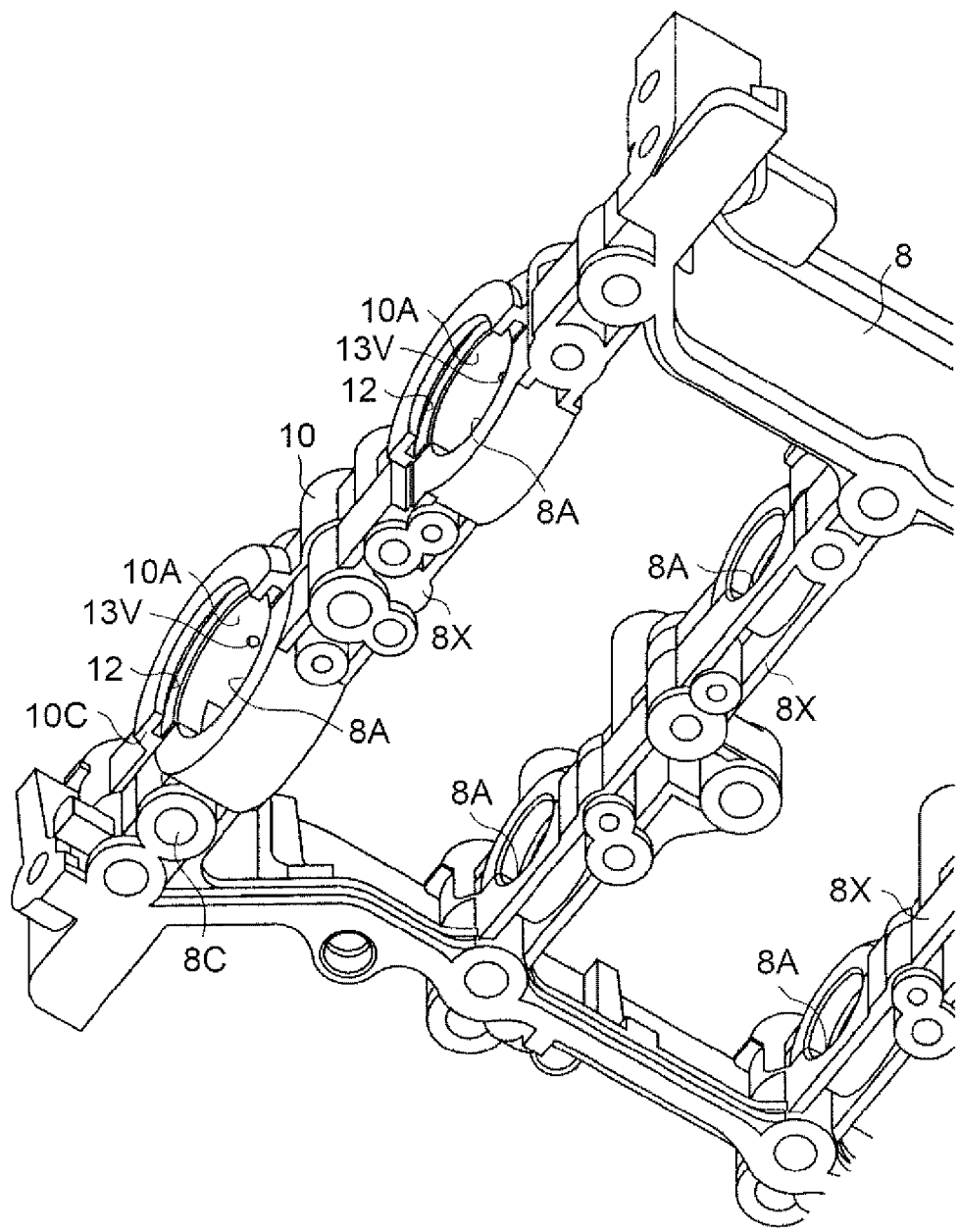
FIG. 2 is a perspective view of the cam cap and a cam housing of the first embodiment.

As illustrated in FIG. 2, a cam cap 10 of the first embodiment is attached to the cam housing 8, so that the cam cap 10 and the cam housing 8 constitute bearings. FIG. 2 is a perspective view of the cam cap 10 and the cam housing 8 when the cam housing 8 is viewed from a position on the cylinder head body 7 side.

As illustrated in FIG. 2, the cam housing 8 includes a plurality of support walls 8X in the form of a ladder. Each support wall 8X has two cam housing concave portions 8A in a semicircular shape. One cam cap is attached to each support wall 8X. In this way, the bearings that support the two camshafts 30 are provided.

The cam cap 10 of the first embodiment is attached to the support wall 8X that is closest to the sprocket 20 among all the support walls 8X. The cam cap 10 has earn cap concave portions 10A in a semicircular shape. The cam cap concave portions 10A are located at such positions as to face the cam housing concave portions 8A.

Thus, when the cam cap 10 is attached to the cam housing 8 as illustrated in FIG. 2, the cam housing concave portions 8A and the cam cap concave portions 10A constitute the circular bearings.

A lower surface of the cam housing 8 includes an oil hole 8C. When the cam housing 8 is attached to the cylinder head body 7, the oil hole 8C is connected to a lubricating oil passage provided in the cylinder head body 7. Thus, a part of the lubricating oil supplied from the oil pan 5 to the cylinder head body 7 via the cylinder block 2, is introduced into the cam housing 8 through the oil hole 8C.

Figure 3:
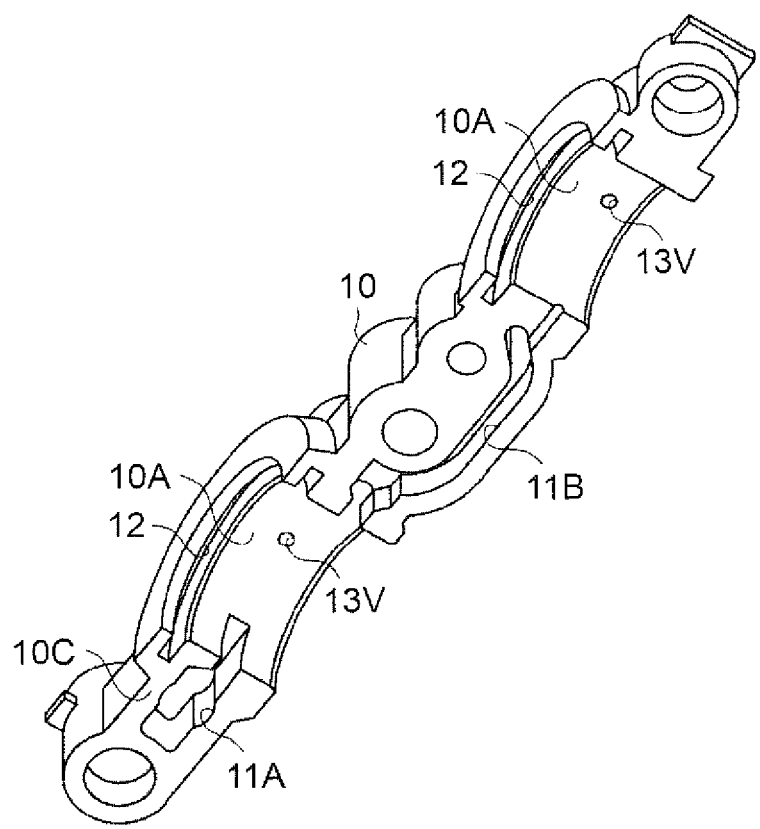
FIG. 3 is a perspective view of the cam cap of the first embodiment.

As illustrated in FIG. 3, a cam cap oil groove 11A is provided in a lower end 10C of the cam cap 10. The lubricating oil supplied through the oil hole 8C of the cam housing 8 is introduced through the cam cap oil groove 11A to the cam cap concave portion 10A. A communication groove 11B that connects the two cam cap concave portions 10A to each other is provided in the lower end 10C of the cam cap 10. The communication groove 11B is located at a position between the two cam cap concave portions 10A.

Figure 4:
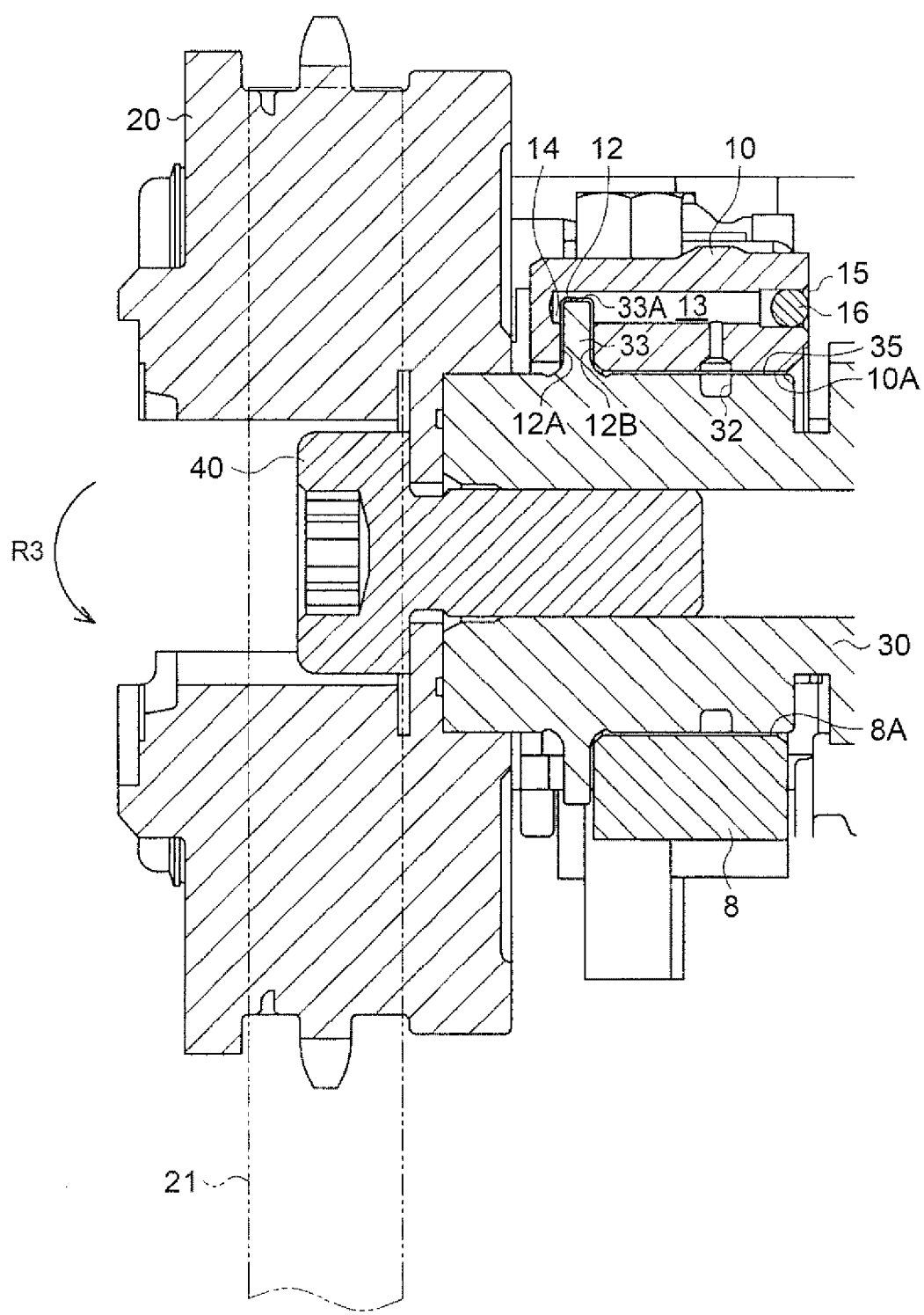
FIG. 4 is sectional view of a bearing constituted by using the cam cap of the first embodiment.

As illustrated in FIG. 4, the journal 35 of the camshaft 30 includes a camshaft oil groove 32. The journal 35 is supported by the cam cap 10. The camshaft oil groove 32 has an annular shape and extends along the entire circumference of the journal 35.

Thus, the lubricating oil introduced to the cam housing 8 through the oil hole 8C is then introduced into one of the cam cap concave portions 10A through the cam cap oil groove 11A, and is supplied through the camshaft oil groove 32 to a sliding section at which the journal 35 and one of the bearings slide with respect to each other. The lubricating oil is introduced also into the other one of the cam cap concave portions 10A through the communication groove 11B. Thus, in the other one of the bearings to which the lubricating oil is supplied through the communication groove 11B, the lubricating oil is also supplied to a sliding section at which the journal 35 and the other one of the bearings slide over each other.

As illustrated in FIG. 4, the journal 35 of the camshaft 30 has a thrust plate 33 that is a disk-shaped protrusion. As illustrated in FIG. 3 and FIG. 4, each cam cap concave portion 10A of the cam cap 10 includes an accommodating groove 12. Thus, as illustrated in FIG. 4, the thrust plate 33 is accommodated in the accommodating groove 12. In the internal combustion engine, the thrust plate 33 is accommodated in the accommodating groove 12 of the cam cap 10, and thus the axial movement of the camshaft 30 is restricted.

The sprocket 20 is attached to an end portion of the camshaft 30 with a bolt 40. As described with reference to FIG. 1, the timing chain 21 is looped over the sprocket 20, and tension of the timing chain 21 is applied to the sprocket 20. Thus, a moment in an R3 direction is generated in the camshaft 30. As a result, in the internal combustion engine, the thrust plate 33 is pressed against a first sidewall 12A positioned on the sprocket 20 side, and a load is applied to the first sidewall 12A. The first sidewall 12A is one of a pair of first and second sidewalls 12A, 12B of the accommodating groove 12, and the thrust plate 33 is interposed between the first sidewall 12A and the second sidewall 12B.

The lubricating oil needs to be sufficiently supplied to a portion to which the thrust plate 33 is pressed due to the tension of the timing chain 21. However, even when the lubricating oil reaches the accommodating groove 12 through a gap between the journal 35 and the cam cap concave portion 10A, it may be difficult to cause the lubricating oil to flow along the outside of the thrust plate 33 and guide the lubricating oil to the first sidewall 12A positioned on the sprocket 20 side.

An accommodating groove, in which the thrust plate 33 is accommodated, is not provided in the cam housing S that covers the journal 35 from below, and the accommodating groove 12 is open at the lower end 10C of the cam cap 10 as illustrated in FIG. 2. Thus, the lubricating oil leaks from openings of the accommodating groove 12 which are located at the lower end 10C. This may make it difficult to supply the lubricating oil from the gap between the journal 35 and the cam cap concave portion 10A to the first sidewall 12A.

Figure 5:
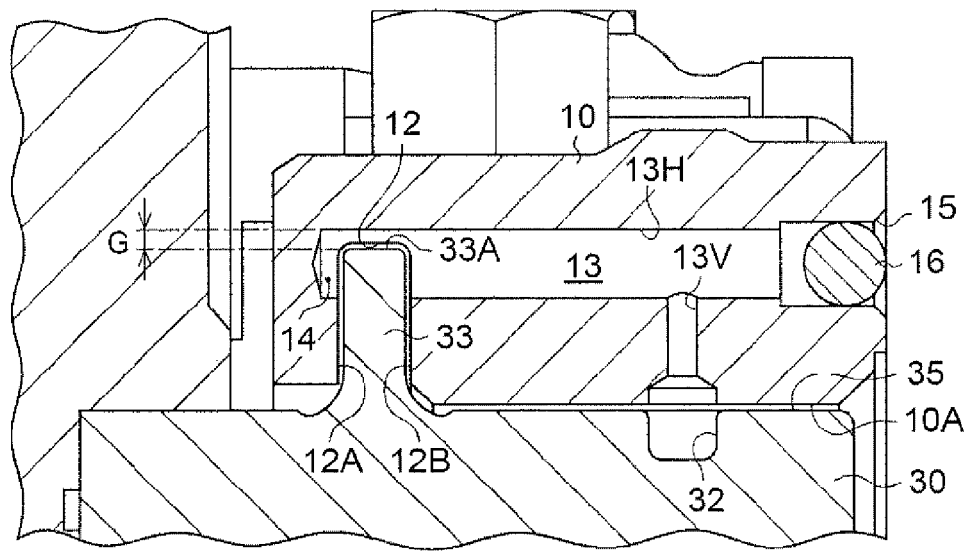
FIG. 5 is an enlarged sectional view of the cam cap of the first embodiment.

In view of this, the cam cap 10 is provided with an oil passage 13 and an oil reservoir 14 through which the lubricating oil is introduced to the first sidewall 12A. With reference to FIG. 5, the oil passage 13 and the oil reservoir 14 will be described in detail.

As illustrated in FIG. 5, the cam cap 10 includes a vertical bore 13V that is open (has an opening) at a position facing the camshaft oil groove 32 and extends in the radial direction of the camshaft 30. The vertical bore 13V is formed by machining from the cam cap concave portion 10A side. As illustrated in FIG. 3, each bearing includes one vertical bore 13V.

The cam cap 10 includes a horizontal bore 13H that intersects with both the vertical bore 13V and the accommodating groove 12. The horizontal bore 13H is formed by machining so as to extend from the right side surface of the cam cap 10 in FIG. 5 toward the left side surface thereof in FIG. 5. An opening 15 of the horizontal bore 13H on the side surface of the cam cap 10 is closed by a sealing plug 16. The vertical bore 13V and the horizontal bore 13H constitute the oil passage 13 that is open at the position facing the camshaft oil groove 32 and is communicated with the accommodating groove 12.

As illustrated in FIG. 4, the horizontal bore 13H extends toward the sprocket 20 beyond the accommodating groove 12 (i.e., the horizontal bore 13H extends to a position that is closer to the sprocket 20 than is the accommodating groove 12). Thus, a recess is formed in the first sidewall 12A, and the recess is formed of a distal end portion of the horizontal bore 13H. The first sidewall 12A is one of the pair of first and second sidewalls 12A, 12B of the accommodating groove 12, and the first sidewall 12A is opposed to the second sidewall 12B on which the oil passage 13 is open. In the cam cap 10, the recess serves as the oil reservoir 14. The opening (at the right side end) of oil passage 13 is located at a position further from the sprocket 20 than is the accommodating groove 12 (i.e., the distance from the sprocket 20 to the opening at the right side end of the oil passage 13 is greater than the distance from the sprocket 20 to the accommodating groove 12). That is, the cam cap 10 is placed on the journal 35 such that the accommodating groove 12 is located at a position closer to the sprocket 20 than is the opening at the right side end of the oil passage 13.

As illustrated in FIG. 5, the position of the horizontal bore 13H is set such that the oil passage 13 and the oil reservoir 14 communicate with each other at a position outward of an outer peripheral edge 33A of the thrust plate 33 in the radial direction of the thrust plate 33, when the thrust plate 33 is accommodated in the accommodating groove 12. The position of the horizontal bore 13H is set such that the outer peripheral edge 33A of the thrust plate 33 is positioned in the horizontal bore 13H and a gap G is formed between the outer peripheral edge 33A of the thrust plate 33 and the wall surface of the horizontal bore 13H.

Next, an operation of the cam cap 10 will be described. The lubricating oil supplied through the oil hole 8C of the cam housing 8 is supplied to the sliding sections, at which the bearings and the journals 35 slide with respect to each other, through the cam cap oil groove 11A, the communication groove 11B, and the camshaft oil grooves 32. Because the opening of the vertical bore 13V, which is the opening of the oil passage 13, is located at a position facing the camshaft oil groove 32, a part of the lubricating oil supplied through the camshaft oil groove 32 flows into the oil passage 13. The lubricating oil, which has flowed into the oil passage 13, reaches the oil reservoir 14 through the gap G located radially outward of the outer peripheral edge 33A of the thrust plate 33. Then, the lubricating oil accumulated in the oil reservoir 14 is supplied to a sliding section at which the first sidewall 12A of the accommodating groove 12 and the thrust plate 33 slide with respect to each other.

The cam cap 10 of the first embodiment produces the following advantageous effects. The lubricating oil supplied from the camshaft oil groove 32 is introduced from the outside of the thrust plate 33 to the oil reservoir 14 through the oil passage 13 provided inside the cam cap 10. The lubricating oil accumulated in the oil reservoir 14, which is located closer to the sprocket 20 than is the thrust plate 33, is supplied to the sliding section at which the first sidewall 12A of the accommodating groove 12, which is located on the sprocket 20 side, and the thrust plate 33 slide with respect to each other. Thus, it is possible to supply the lubricating oil to the first sidewall 12A of the accommodating groove 12 in which the thrust plate 33 is accommodated.

The vertical bore 13V extending in the radial direction of the camshaft 30 and the horizontal bore 13H intersecting with both the vertical bore 13V and the accommodating groove 12 constitute the oil passage 13. The distal end portion of the horizontal bore 13H serves as the oil reservoir 14. Thus, the oil passage 13 and the oil reservoir 14 are formed from two oil bores, that is, the vertical bore 13V and the horizontal bore 13H.

The horizontal bore 13H is formed from the side surface of the cam cap 10, and the opening 15 of the horizontal bore 13H, which is located on the side surface of the cam cap 10, is sealed with the sealing plug 16. Thus, the horizontal bore 13H is formed by machining, and therefore the horizontal bore 13H is formed more easily than in a case where a horizontal bore 13H is formed during casting of a cam cap 10.

The vertical bore 13V is formed to extend from the position facing the camshaft oil groove 32. Thus, the vertical bore 13V is formed by machining, and therefore the vertical bore 13V is formed more easily than in a case where a vertical bore 13V is formed during casting of a cam cap 10.

Because the horizontal bore 13H is formed by machining, it is possible to adjust the flow rate of the lubricating oil to be supplied to the oil reservoir 14 by adjusting the position at which the horizontal bore 13H is formed without changing the diameter of the horizontal bore 13H. For example, when the horizontal bore 13H is formed at a position inward of the position of the horizontal bore 13H in the example illustrated in FIG. 5, in the radial direction of the thrust plate 33, the gap G is narrowed to decrease the flow rate of the lubricating oil to be supplied to the oil reservoir 14. When the diameter of the horizontal bore 13H is decreased in order to decrease the flow rate of the lubricating oil to be supplied to the oil reservoir 14, there is a possibility that a blade of a machining tool may be broken during machining or cleaning efficiency after machining may decrease. In contrast to this, when the flow rate of the lubricating oil to be supplied to the oil reservoir 14 is adjusted by adjusting the position where the horizontal bore 13H is formed, it is possible to prevent the blade of the machine tool from being broken, and to prevent the cleaning efficiency after the machining from decreasing.

Next, a cam cap 10 of a second embodiment will be described with reference to FIG. 6. The cam cap 10 of the second embodiment is different from the cam cap 10 of the first embodiment in that a sealing plug is provided in the cam cap 10, at a position on the sprocket 20 side.

Figure 6:
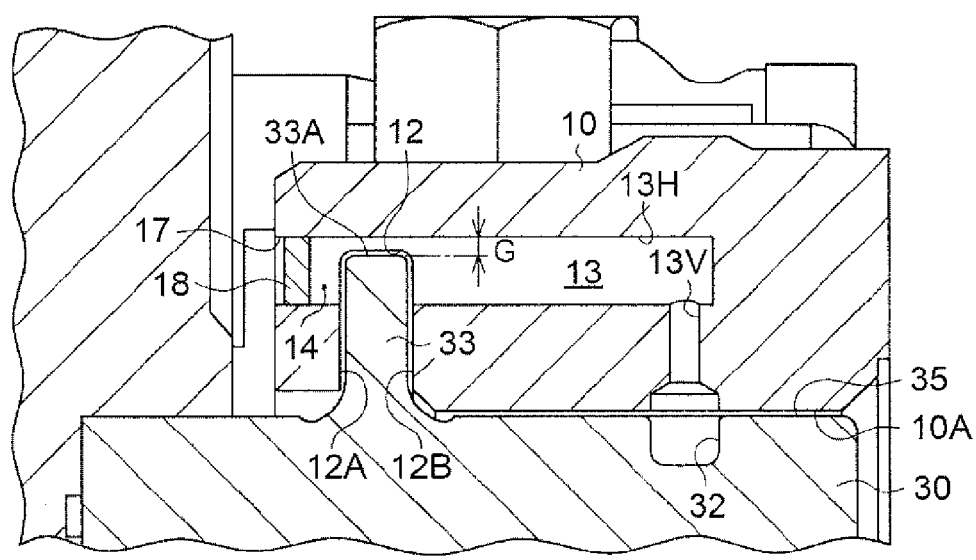
FIG. 6 is an enlarged sectional view of a cam cap of a second embodiment.
Figure 7:
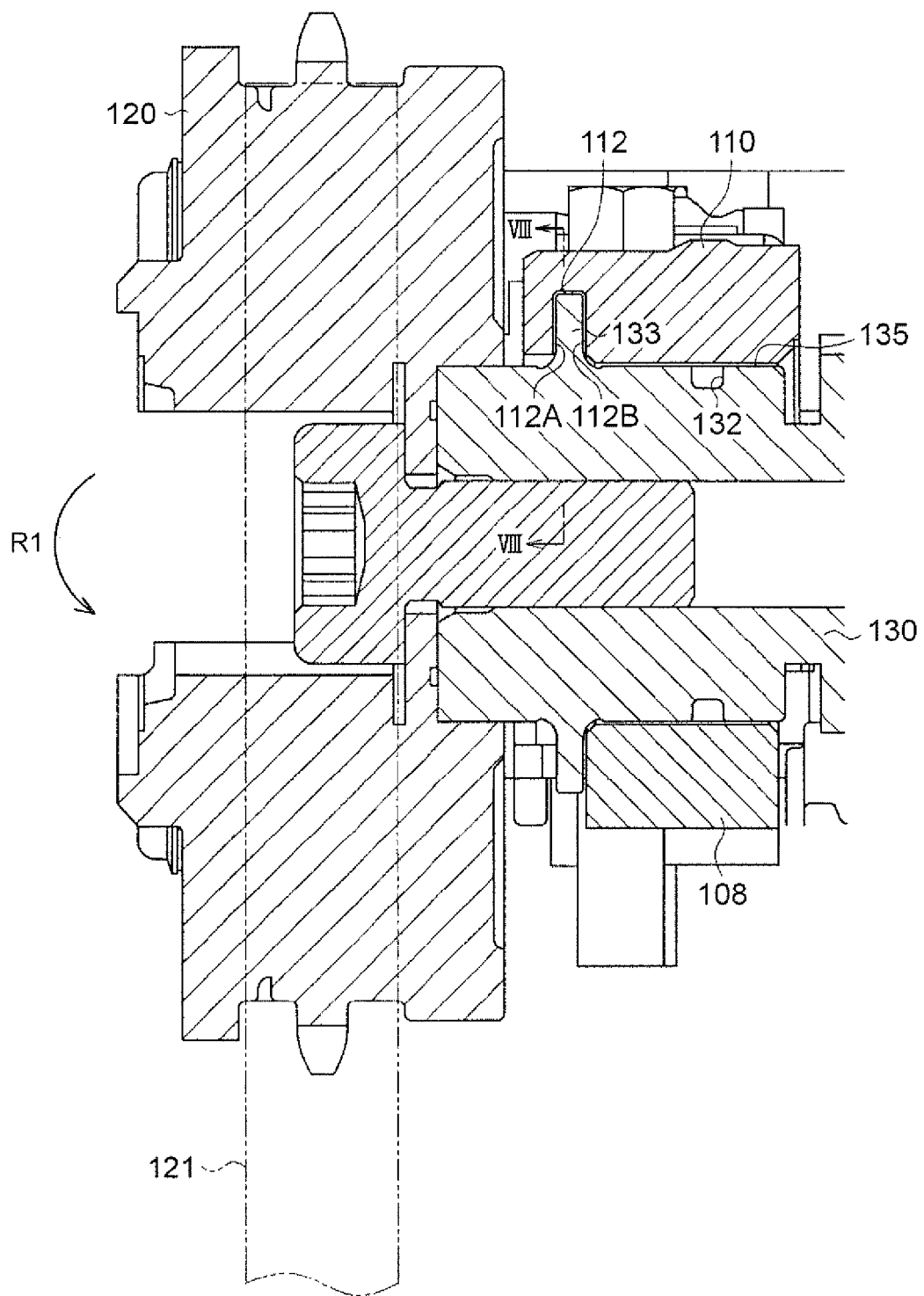
FIG. 7 is a sectional view of a bearing for a camshaft in related art.
Figure 8:
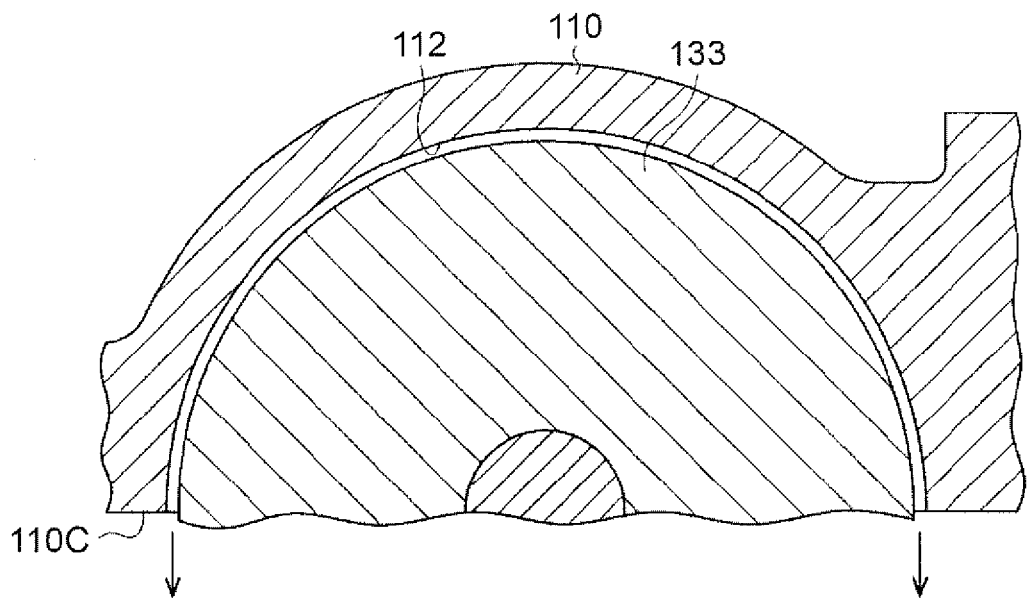
FIG. 8 is a sectional view taken along the line VIII-VIII in FIG. 7.

As illustrated in FIG. 6, a horizontal bore 13H that constitutes an oil passage 13 of the cam cap 10 of the second embodiment is formed by machining from a side surface of the cam cap 10, which is located on the sprocket 20 side. Like the horizontal bore 13H of the cam cap 10 of the first embodiment, the horizontal bore 13H of the second embodiment intersects with both the vertical bore 13V and the accommodating groove 12. An opening 17 of the horizontal bore 13H is sealed with a sealing plug 18. Thus, in the cam cap 10 of the second embodiment, a space is formed between the sealing plug 18 and the thrust plate 33, and the space serves as an oil reservoir 14. That is, in the cam cap 10 of the second embodiment, the oil reservoir 14 is formed of an end portion of the horizontal bore 13H, the end portion being located on the sprocket 20 side and sealed with the sealing plug 18.

The cam cap 10 of the second embodiment produces the advantageous effects similar to those of the first embodiment. That is, a part of the lubricating oil supplied through the camshaft oil groove 32 flows into the oil passage 13. The lubricating oil, which has flowed into the oil passage 13, reaches the oil reservoir 14 through the gap G located radially outward of the outer peripheral edge 33A of the thrust plate 33. Then, the lubricating oil accumulated in the oil reservoir 14 is supplied to a sliding section at which the first sidewall 12A of the accommodating groove 12 and the thrust plate 33 slide with respect to each other.

In the cam cap 10 of the second embodiment, the oil reservoir 14 is formed of the space positioned between the accommodating groove 12 and the sealing plug 18. Thus, it is possible to adjust the volume of the oil reservoir 14 by adjusting the shape of the sealing plug 18, such as the thickness thereof.

When the cam cap 10 is manufactured, a process of fitting the sealing plug 18 into the opening 17 of the horizontal bore 13H is performed after a process of machining for forming the horizontal bore 13H. Thus, in the cam cap 10 of the second embodiment, it is possible to adjust the volume of the oil reservoir 14 in the process performed after the process of machining.

The cam cap 10 of the second embodiment produces the following advantageous effects, in addition to the advantageous effects produced by the cam cap 10 of the first embodiment. The oil reservoir 14 is formed of the end portion of the horizontal bore 13H, the end portion being on the sprocket 20 side and sealed with the sealing plug 18. Thus, it is possible to adjust the depth of the oil reservoir 14, that is, the volume of the oil reservoir 14, by adjusting the shape of the sealing plug 18. Because it is possible to adjust the volume of the oil reservoir 14 in the process performed after the process of machining, the flexibility in manufacturing is enhanced.

Elements that may be modified in each of the foregoing embodiments are as follows. In the cam cap 10 of each of the foregoing embodiments, the oil passage 13 and the oil reservoir 14 are provided in each of the two bearings that support the two camshafts 30, that is, the bearing that supports the intake camshaft and the bearing that supports the exhaust camshaft. However, the oil passage 13 and the oil reservoir 14 may be provided in only one of the two bearings.

In each of the foregoing embodiments, the cam cap 10 including the oil passage 13 and the oil reservoir 14 is employed in the internal combustion engine in which accommodating grooves for accommodating the thrust plates 33 are not provided in the cam housing 8. However, a cam cap 10 similar to the one in each of the foregoing embodiments may be employed in an internal combustion engine in which accommodating grooves for accommodating the thrust plates 33 are provided in a cam housing 8.

In each of the foregoing embodiments, the cam cap 10 including the oil passage 13 and the oil reservoir 14 is employed as a cam cap that constitutes each bearing that supports the journal 35 closest to the sprocket 20. However, a cam cap 10 similar to the one in each of the foregoing embodiments may be used for another journal 35.

In each of the foregoing embodiments, the oil passage 13 is formed by machining. However, the method for forming the oil passage 13 may be changed. For example, an oil passage 13 may be formed during casting of the cam cap 10. For example, any one of the vertical bore 13V and the horizontal bore 13H may be formed during casting of the cam cap 10, or both the vertical bore 13V and the horizontal bore 13H may be formed during casting of the cam cap 10.

In each of the foregoing embodiments, the vertical bore 13V and the horizontal bore 13H that intersect with each other constitute the oil passage 13. However, the shape of the oil passage 13 may be changed. For example, an oil passage 13 may be formed such that the oil passage 13 extends straight from a position facing the camshaft oil groove 32 so as to intersect with the accommodating groove 12. Further, an intermediate portion of the oil passage 13 may be curved.

In each of the foregoing embodiments, each of the bearings formed by the cam cap 10 includes one oil passage 13 and one reservoir 14. However, each of the bearings may include a plurality of oil passages 13 and a plurality of oil reservoirs 14.

The cam cap 10 of each of the foregoing embodiments has two cam cap concave portions 10A and supports the two camshafts 30. However, the oil passage 13 and the oil reservoir 14 may be provided in a cam cap that has one cam cap concave portion and supports one camshaft, or a cam cap that has three or more cam cap concave portions and supports three or more camshafts.

What is claimed is:

1. A cam cap configured to be placed on a journal of a camshaft attached to a sprocket, the cam cap constituting a bearing that supports the journal, the cam cap comprising:
   an accommodating groove configured to accommodate a thrust plate of the journal, the accommodating groove having a first sidewall and a second sidewall, the first and second sidewalls opposing each other, the first sidewall being located in a portion of the cam cap that is closer to the sprocket than the second sidewall when the cam cap is placed on the journal of the camshaft;
   an oil passage having an opening at a position facing a camshaft oil groove of the journal when the cam cap is placed on the journal of the camshaft, the oil passage communicating with the accommodating groove; and
   an oil reservoir provided in the first sidewall, the oil reservoir being a recess, wherein
   when the cam cap is placed on the journal of the camshaft, the accommodating groove is located at a position closer to the sprocket than is the opening of the oil passage, and
   when the cam cap is placed on the journal of the camshaft such that the thrust plate is accommodated in the accommodating groove, the oil passage and the oil reservoir communicate with each other, at a position outward of an outer peripheral edge of the thrust plate in a radial direction of the thrust plate.

2. The cam cap according to claim 1, wherein:
   the oil passage has a vertical bore and a horizontal bore;
   the vertical bore extends in a radial direction of the camshaft from the opening at the position facing the camshaft oil groove;
   the horizontal bore intersects with the vertical bore and the accommodating groove; and
   the oil reservoir is a distal end portion of the horizontal bore.

3. The cam cap according to claim 2, further comprising a sealing plug that seals an opening of the horizontal bore, the opening being located on a side surface of the cam cap, wherein
   the horizontal bore extends from the side surface of the cam cap into the cam cap.

4. The cam cap according to claim 2, wherein the vertical bore is provided at a position facing the camshaft oil groove.

5. The cam cap according to claim 1, further comprising a sealing plug, wherein:
   the oil passage has a vertical bore and a horizontal bore;
   the vertical bore extends in a radial direction of the camshaft from the opening at the position facing the camshaft oil groove;
   the horizontal bore extends from a side surface of the cam cap, the side surface being located on a sprocket side of the cam cap, and the horizontal bore intersects with the accommodating groove and the vertical bore;
   the sealing plug seals an opening of the horizontal bore, the opening being located on the side surface of the cam cap; and
   the oil reservoir is an end portion of the horizontal bore, the end portion extending between the first sidewall of the accommodating groove and an end of the sealing plug.

6. The cam cap according to claim 5, wherein the vertical bore is provided at a position facing the camshaft oil groove.

* * * * *